United States Patent
Matsuoka et al.

(10) Patent No.: US 6,960,628 B2
(45) Date of Patent: Nov. 1, 2005

(54) POLYPHENYLENE SULFIDE RESIN COMPOSITION

(75) Inventors: Hideo Matsuoka, Ichinomiya (JP); Masaru Tateyama, Nagoya (JP); Yoshihiro Yamami, Nagoya (JP); Kei Saito, Nagoya (JP); Atsushi Ishio, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 10/746,822

(22) Filed: Dec. 24, 2003

(65) Prior Publication Data

US 2004/0143069 A1 Jul. 22, 2004

(30) Foreign Application Priority Data

Dec. 27, 2002 (JP) ........................................ 2002-380257
Aug. 29, 2003 (JP) ........................................ 2003-306216

(51) Int. Cl.[7] .............................................. C08L 81/04
(52) U.S. Cl. ........................... 525/68; 525/64; 525/150; 525/189
(58) Field of Search ............................ 525/68, 64, 150, 525/189

(56) References Cited

U.S. PATENT DOCUMENTS

| 4,581,411 A | 4/1986 | Liang |
| 4,889,893 A | 12/1989 | Kobayashi |
| 5,625,002 A | 4/1997 | Kadoi |
| 6,740,709 B2 * | 5/2004 | Ono et al. .................... 525/68 |

FOREIGN PATENT DOCUMENTS

| EP | 1 229 078 A1 | 8/2002 |
| EP | 1 229 082 A1 | 8/2002 |
| JP | 62153343 | 7/1987 |
| JP | 62153344 | 7/1987 |
| JP | 06-299071 | 10/1994 |
| JP | 2000-198923 | 7/2000 |
| JP | 2002-226706 | 8/2002 |

* cited by examiner

*Primary Examiner*—Ana Woodward
(74) *Attorney, Agent, or Firm*—DLA Piper Rudnick Gray Cary US LLP (57) ABSTRACT

The present invention is a polyphenylene sulfide resin composition comprising (a) a polyphenylene sulfide resin and (b) an olefin-based resin, and satisfying the following conditions (i) through (v): (i) The mixing ratio of the polyphenylene sulfide resin (a) and the olefin-based resin (b) is such that the amount of the polyphenylene sulfide resin (a) is in a range from 95 to 60 wt %, while the amount of the olefin-based resin (b) is in a range from 5 to 40 wt %, with the total weight of both the ingredients as 100 wt %; (hi) said olefin-based resin (b) comprising two copolymer: (b-1) an epoxy group-containing olefin copolymer and (b-2) an ethylene/(α-olefin copolymer obtained by copolymerizing ethylene and an α-olefin having 3 to 20 carbon atoms; (iii) as the morphology observed by an electron microscope, said polyphenylene sulfide resin (a) forms a continuous phase, and said olefin-based resin (b) forms a dispersion phase and has a core-shell structure having said ethylene/α-olefin copolymer (b-2) acting as a core component contained in said epoxy group-containing olefin copolymer (b-1) acting as a shell component: (iv) the melt flow rate measured at a temperature of 315.5° C. and at a load of 5000 g according to ASTM-D-1238 is in a range from 10 to 50 g/10 min; and (v) the notched impact strength measured at −40° C. according to ASTM-D-256 is 300 J/m or more. This invention provides a PPS resin composition excellent in flowability, impact properties and low-temperature roughness and suitable for injection molding.

5 Claims, 1 Drawing Sheet

POLYPHENYLENE SULFIDE RESIN COMPOSITION

BACKGROUND OF THE INVENTION

1. Technical Field

The present invention relates to a polyphenylene sulfide resin composition suitable for injection molding.

2. Background Art

Polyphenylene sulfide (hereinafter called PPS) resins have excellent properties such as heat resistance, barrier properties, chemicals resistance, electric insulation and moist heat resistance suitable as engineering plastics, and are usually injection-molded for use as various electric and electronic parts, machine parts, automobile parts and so on.

However, PPS resins are lower in toughness than other engineering plastics such as nylon and PBT, being limited in applicable range, and the improvement of PPS resins is highly demanded.

For improving the toughness of PPS resins, methods of melt-blending various soft resins and the like have been studied. For example, U.S. Pat. No. 4,581,411 discloses adding a polyolefin-based elastomer such as ethylene/propylene copolymer elastomer to PPS, and U.S. Pat. No. 4,889,893 discloses a method of adding an α-olefin-glycidyl methacrylate copolymer, etc. However, these PPS resins do not have sufficient impact properties.

U.S. Pat. No. 5,625,002 discloses a method in which an olefin copolymer containing epoxy groups and an elastomer free from epoxy groups and acid anhydride groups are mixed with a specific PPS resin. JP2000-198923A discloses a method in which an ethylene/α-olefin copolymer having a specific molecular weight distribution and an olefin copolymer containing functional groups such as epoxy groups and acid anhydride groups are mixed with a PPS resin. Furthermore, JP2002-226706A discloses a method in which a specific olefin copolymer is finely dispersed into a specific PPS resin for achieving a high impact resistance of 700 J/m or more in Izod impact strength.

However, as PPS resin materials are being used in wider areas in recent years, the materials are required to have more sophisticated properties such as the moldability for allowing oversized parts to be molded and the toughness at low temperature. In this situation, the resin compositions proposed so far cannot sufficiently satisfy these requirements, and it is demanded to develop an economically advantageous material having higher flowability (moldability), impact properties and low-temperature toughness.

SUMMARY OF THE INVENTION

The problem to be solved by the present invention is to provide a polyphenylene sulfide resin composition specifically excellent in flowability, impact properties and low-temperature toughness and suitable for oversized injection molding.

The inventors studied to solve the above-mentioned problem, and as a result, found that if plural specific olefin copolymers are used to form a core-shell dispersion phase in a continuous phase composed of a PPS resin, the above-mentioned problem can be solved. Thus, the present invention has been arrived at.

This invention is a polyphenylene sulfide resin composition comprising (a) a polyphenylene sulfide resin and (b) an olefin-based resin, and satisfying the following conditions (i) through (v):

(i) The mixing ratio of the polyphenylene sulfide resin (a) and the olefin-based resin (b) is such that the amount of the polyphenylene sulfide resin (a) is in a range from 95 to 60 wt %, while the amount of the olefin-based resin (b) is in a range from 5 to 40 wt %, with the total weight of both the ingredients as 100 wt %;

(ii) Said olefin-based resin (b) comprising two copolymers: (b-1) an epoxy group-containing olefin copolymer and (b-2) an ethylene/α-olefin copolymer obtained by copolymerizing ethylene and an α-olefin having 3 to 20 carbon atoms;

(iii) As the morphology of the polyphenylene sulfide resin composition observed by an electron microscope, said polyphenylene sulfide resin (a) forms a continuous phase, and said olefin-based resin (b) forms a dispersion phase and has a core-shell structure having said ethylene/α-olefin copolymer (b-2) acting as a core component contained in said epoxy group-containing olefin copolymer (b-1) acting as a shell component;

(iv) The melt flow rate of the polyphenylene sulfide resin composition measured at a temperature of 315.5° C. and at a load of 5000 g according to ASTM-D-1238 is in a range from 10 to 50 g/10 min;

(v) The notched impact strength of the polyphenylene sulfide resin composition measured at −40° C. according to ASTM-D-256 is 300 J/m or more.

BRIEF DESCRIPTION OF THE DRAWINGS

In FIGS. 1 and 2, 1 denotes a PPS resin (a); 2, an epoxy group-containing olefin copolymer (b-1); and 3, an ethylene/α-olefin copolymer (b-2) respectively.

DESIRABLE MODES FOR CARRYING OUT THE INVENTION

Modes for carrying out the invention are described below in detail.

(1) PPS Resin

The PPS resin (a) used in this invention is a polymer having recurring units represented by the following structural formula (I).

In view of heat resistance, it is preferred that the polymer contains 70 mol % or more of the recurring units represented by said structural formula. A polymer containing 90 mol % or more of the recurring units is more preferred. Less than 30 mol % of the recurring units of the PPS resin can consist of the recurring units represented by the following structures, etc.

The PPS polymer partially having such structures has a low melting point. If the resin composition of this invention has a low melting point, it is advantageous in view of moldability.

The PPS resin is excellent in heat resistance, chemicals resistance, flame retardancy, electric properties and mechanical properties, being especially suitable for injection molding.

It is preferred that the PPS resin (a) used in this invention is a PPS resin (a-1) having a melt flow rate (hereinafter called MFR) of 100 to 400 g/10 min as measured at a temperature of 315.5° C. and at a load of 5000 g according to ASTM-D-1238 and having a chloroform extractable fraction of 2 to 4 wt %. A more preferred MFR range of the PPS resin (a-1) is from 150 to 350 g/10 min, and a further more preferred range is from 200 to 300 g/10 min. It is preferred that the chloroform extractable fraction of the PPS resin (a-1) is in a range from 2 to 3.5 wt %, and a more preferred range is from 2.2 to 3 wt %. Furthermore, it is preferred that the PPS resin is not crosslinked. An MFR of less than 100 g/10 min is not preferred, since the flowability of the obtained PPS resin composition declines, making it difficult to produce oversized molded parts. An MFR of more than 400 g/10 min is not preferred either, since the impact strength of the obtained PPS resin composition becomes so low as to allow oversized molded parts to be cracked.

The chloroform extractable fraction indicates the organic oligomer content. The chloroform extractable fraction in this invention is calculated from the amount remaining after subjecting 10 g of a polymer sample to Soxhlet extraction for 5 hours using 200 mL of chloroform. If the oligomer content is in the above-mentioned range, the obtained PPS resin composition can be satisfactory in both flowability and impact strength. A chloroform extractable fraction of less than 2 wt % is not preferred, since the flowability of the obtained PPS resin composition tends to decline, making it difficult to achieve a balance between flowability and impact strength. A chloroform extractable fraction of more than 4 wt % is not preferred either, since the oligomer content is so large as to give a tendency that the impact strength declines. For obtaining a PPS resin with the chloroform extractable fraction kept in the above-mentioned range, the flash method described later is an effective production method.

It is preferred that the PPS resin (a-1) is a substantially linear PPS resin not increased in molecular weight by means of crosslinking. A PPS resin with its MFR kept in the above-mentioned range without being increased in molecular weight by crosslinking is higher in impact properties than a PPS resin obtained by increasing the molecular weight of a low-molecular weight (high-MFR) PPS by means of crosslinking. Furthermore, a substantially linear PPS resin is preferred, since the core-shell structure is likely to be formed in the olefin-based resin (b) described later.

It is preferred that the ash content of the PPS resin (a-1) is in a range from 0.35 wt % to 0.65 wt %. A more preferred range is from 0.40 wt % to 0.60 wt %. The ash content indicates the ionic compound contained in the PPS resin. If the ash content in the above-mentioned range, the compatibility enhancing effect by the ionic compound improves low-temperature properties, especially low-temperature tensile elongation. If the ash content is less than 0.35 wt %, the compatibility enhancing effect by the ionic compound declines to lower the low-temperature tensile elongation. On the other hand, an ash content of more than 0.65 wt % is not preferred, since the formation of the core-shell structure in the olefin-based resin (b) described later is impaired to lower the low-temperature impact strength.

For measuring the ash content, about 5 g of a PPS resin dried at 150° C. for 1 hour is weighed, placed in a crucible, preliminarily burned using an electric heater for about 3 hours, and burned using the electric furnace at 550° C. for about 20 hours for perfect incineration. The remaining weight is measured, and the rate of it to the weight of the dried resin is calculated as the ash content.

The PPS resin (a) can further contain a PPS resin (a-2) in addition to the PPS resin (a-1). It is preferred that the PPS resin (a-2) used in this invention has an MFR of 50 to 800 g/10 min as measured at a temperature of 315.5° C. and at a load of 5000 g according to ASTM-D-1238, has a chloroform extractable fraction of as small as 1 wt % or less, and is not crosslinked. It is especially preferred that the MFR is in a range from 50 to 200 g/10 min and that the chloroform extractable fraction is 0.6 wt % or less. It is preferred that the amount of the PPS resin (a-2) added is in a range from 5 to 80 parts by weight per 100 parts by weight of the PPS resin (a-1). A more preferred range is from 10 to 60 parts by weight. It is not preferred that the amount of the PPS resin (a-2) is more than 80 parts by weight, since the balance of flowability becomes poor.

(2) Olefin-based Resin
[Amount of the Olefin-Based Resin Added]

The mixing ratio of the PPS resin (a) and the olefin-based resin in this invention is such that the amount of the PPS resin (a) is in a range from 95 to 60 wt %, while the amount of the olefin-based resin is in a range from 5 to 40 wt %, with the total amount of both the ingredients as 100 wt %. It is preferred that the amount of the PPS resin (a) is in a range from 85 to 70 wt %, while the amount of the olefin-based resin (b) is in a range from 15 to 30 wt %. It is not preferred that the amount of the olefin-based resin is less than 5 wt %, since it is difficult to obtain the effects of improving flexibility and impact properties. It is not preferred either that the amount of the olefin-based resin is more than 40 wt % on the contrary, since the thermal stability and barrier properties peculiar to the PPS resin are impaired, and since the viscosity during melt kneading becomes large to give a tendency of lowering flowability.

[MFR and Density of the Olefin-Based Resin]

It is preferred that the melt flow rate (MFR) of the olefin-based resin (b) of this invention measured at 190° C. and at a load of 2160 g according to ASTM-D-1238 is in a range from 0.01 to 70 g/10 min. A more preferred range is from 0.03 to 60 g/10 min. An MFR of less than 0.01 g/10 min is not preferred, since the flowability of the resin composition declines. An MFR of more tan 70 g/10 min is not preferred either, since the impact resistance may decline depending on the shape of the molded part.

It is preferred that the density of the olefin-based resin (b) of this invention is in a range from 800 to 970 kg/m$^3$. A density of higher than 970 kg/m$^3$ is not preferred, since it is difficult to exhibit the low-temperature toughness. A density of lower than 800 kg/m$^3$ is not preferred either, since the handling properties decline.

[Mixing Ratio of (b-1) and (b-2)]

In this invention, as the olefin-based resin (b), it is necessary to use both the epoxy group-containing olefin copolymer (b-1) and the ethylene/α-olefin copolymer (b-2) obtained by copolymerizing ethylene and an α-olefin with 3 to 20 carbon atoms. It is preferred that their mixing ratio is such that the amount of the ingredient (b-1) is in a range from 5 to 60 wt %, while the amount of the ingredient (b-2) is in a range from 95 to 40 wt %, with the total amount of both the ingredients as 100 wt %. It is more preferred that the amount of the ingredient (b-1) is in a range from 10 to 50 wt %, while the amount of the ingredient (b-2) is in a range from 90 to 50 wt %. It is further more preferred that the amount of the ingredient (b-1) is in a range from 10 to 40 wt %, while the amount of the ingredient (b-2) is in a range from 90 to 60 wt %. If the amount of the ingredient (b-1) is smaller than 5 wt %, the intended morphology tends to be difficult to obtain. If the amount of the ingredient (b-1) is larger than 60 wt %, the viscosity during melt kneading tends to increase.

[Epoxy Group-Containing Olefin Copolymer (b-1)]

The epoxy group-containing olefin copolymer (b-1) used in this invention is an olefin copolymer obtained by introducing a monomer having an epoxy group as a component into an olefin polymer or olefin copolymer.

Examples the functional group-containing monomer for introducing the epoxy group-containing monomer as a component include glycidyl acrylate, glycidyl methacrylate, glycidyl ethacrylate, glycidyl itaconate, glycidyl citraconate, etc.

The method for introducing an epoxy group-containing monomer is not especially limited. The monomer can be copolymerized when the olefin polymer or copolymer is produced, or it can be graft-introduced into the olefin polymer or copolymer using a radical initiator.

The amount of the epoxy group-containing monomer to be introduced is in a range from 0.001 to 40 mol % based on the entire amount of the epoxy group-containing olefin copolymer. A preferred range is from 0.01 to 35 mol %.

A preferred example of the epoxy group-containing olefin copolymer (b-1) especially useful in this invention is an olefin copolymer obtained with an α-olefin and the glycidyl ester of an α,β-unsaturated carboxylic acid as essential comonomers. As the α-olefin, ethylene is preferred. The copolymer can also be copolymerized with an α,β-unsaturated carboxylic acid or any of its alkyl esters such as acrylic acid, methyl acrylate, ethyl acrylate, butyl acrylate, methacrylic acid, methyl methacrylate, ethyl methacrylate and butyl methacrylate.

In this invention, an olefin copolymer with 60 to 99 wt % of an α-olefin and 1 to 40 wt % of the glycidyl ester of an α,β-unsaturated carboxylic acid as essential comonomers is especially preferred.

The glycidyl ester of an α,β-unsaturated carboxylic acid refers to a compound represented by the following formula:

(where R denotes a hydrogen atom or lower alkyl group.) Examples of the glycidyl ester of an α,β-unsaturated carboxylic acid include glycidyl acrylate, glycidyl methacrylate and glycidyl ethacrylate. Among them, glycidyl methacrylate can be preferably used. Examples of the olefin copolymer with an α-olefin and the glycidyl ester of an α,β-unsaturated carboxylic acid as essential comonomers include ethylene/propylene-g-glycidyl methacrylate copolymer ("g" stands for graft; hereinafter this applies), ethylene/butene-1-g-glycidyl methacrylate copolymer, ethylene/glycidyl acrylate copolymer, ethylene/glycidyl methacrylate copolymer, ethylene/methyl acrylate/glycidyl methacrylate copolymer and ethylene/methyl methacrylate/glycidyl methacrylate copolymer. Among them, a copolymer selected from ethylene/glycidyl methacrylate copolymer, ethylene/methyl acrylate/glycidyl methacrylate copolymer and ethylene/methyl methacrylate/glycidyl methacrylate copolymer can be preferably used.

[Ethylene/α-Olefin Copolymer (b-2)]

Furthermore, the ethylene/α-olefin copolymer (b-2) obtained from ethylene and an α-olefin with 3 to 20 carbon atoms especially useful in this invention refers to a copolymer with ethylene and at least one α-olefin having 3 to 20 carbon atoms as components. Examples of said α-olefin having 3 to 20 carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene, and combinations thereof. Among these α-olefins, a copolymer using an α-olefin having 4 to 12 carbon atoms is preferred, since it is improved in mechanical strength and further improved in the effect of modification.

(3) Antioxidant

In this invention, to keep high heat resistance and thermal stability, it is preferred to let the resin composition contain at least one or more antioxidants selected from phenol-based antioxidants and phosphorus-based antioxidants. It is preferred that the amount of the antioxidant is 0.01 part by weight or more, especially 0.02 part by weight or more per 100 parts by weight of the PPS resin (a) and the olefin-based resin (b) in total. It is preferred that the amount of the antioxidant is 5 parts by weight or less, especially 1 part by weight or less per 100 parts by weight of the PPS resin (a) and the olefin-based resin (b) in total. It is also preferred to use a phenol-based antioxidant and a phosphorus-based antioxidant together, since especially the effects of keeping heat resistance and thermal stability are large.

As the phenol-based antioxidant, a hindered phenol-based compound can be preferably used. Examples of the hindered phenol-based compound include triethyleneglycol-bis[3-t-butyl-(5-methyl-4-hydroxyphenyl)propionate], N,N'-hexamethylenebis(3,5-di-t-butyl-4-hydroxy-hydrocinnamide), tetrakis[methylene-3-(3',5'-di-t-butyl-4'-hydroxyphenyl)propionate]methane, pentaerythrityltetrakis [3-(3',5'-di-t-butyl-4'-hydroxyphenyl)propionate], 1,3,5-tris (3,5-di-t-butyl-4-hydroxybenzyl)-s-triazine-2,4,6-(1H,3H, 5H)-trione, 1,1,3-tris(2-methyl-4-hydroxy-5-t-butylphenyl) butane, 4,4'-butylidenebis(3-methyl-6-t-butylphenol), n-octadecyl-3-(3,5-di-t-butyl-4-hydroxy-phenyl)propionate, 3,9-bis[2-(3-(3-t-butyl-4-hydroxy-5-methylphenyl) propionyloxy)-1,1-dimethylethyl]-2,4,8,10-tetraoxaspiro[5, 5]undecane, 1,3,5-trimethyl-2,4,6-tris-(3,5-di-t-butyl-4-hydroxybenzyl)benzene, etc. Among them, an ester-type polymeric hindered phenol compound is preferred. Particularly, it is preferred to use tetrakis[methylene-3-(3', 5'-di-t-butyl-4'-hydroxyphenyl)propionate]methane, pentaerythrityltetrakis[3-(3',5'-di-t-butyl-4'-hydroxyphenyl) propionate], 3,9-bis[2-(3-(3-t-butyl-4-hydroxy-5-methylphenyl)propionyloxy)-1,1-dimethylethyl]-2,4,8,10-tetraoxaspiro[5,5]undecane, etc.

Examples of the phosphorus-based antioxidant include bis(2,6-di-t-butyl-4-methylphenyl)pentaerythritol-di-phosphite, bis(2,4-di-t-butylphenyl)pentaerythritol-di-phosphite, bis(2,4-di-cumylphenyl)pentaerythritol-di-phosphite, tris(2,4-di-t-butylphenyl)phosphite, tetrakis(2,4-di-t-butylphenyl)-4,4'-bisphenylene phosphite, di-stearylpentaerithritol-di-phosphite, triphenyl phosphite, 3,5-di-butyl-4-hydroxybenzyl phosphonate diethyl ester, etc.

Among them, for decreasing the volatilization and decomposition of the antioxidant during the compounding of the PPS resin, an antioxidant with a high melting point is preferred. Particularly it is preferred to use bis(2,6-di-t-butyl-4-methylphenyl)pentaerythritol-di-phosphite, bis(2,4-di-t-butylphenyl)pentaerythritol-di-phosphite, bis(2,4-di-cumylphenyl)pentaerythritol-di-phosphite, etc.

(4) Other Additives

Furthermore, to such an extent that the effects of this invention are not impaired, a resin other than the olefin-based resin can be added to the PPS resin composition of this invention. For example, if a small amount of a highly flexible thermoplastic resin is added, flexibility and impact properties can be further improved. However, it is not preferred that the amount of the thermoplastic resin is more than 50 wt % based on the weight of the entire composition, since the features peculiar to the PPS resin are impaired. It is especially preferred that the amount is 30 wt % or less. Examples of the thermoplastic resin include a polyamide resin, polybutylene terephthalate resin, polyethylene terephthalate resin, modified polyphenylene ether resin, polysulfone resin, polyaryl sulfone resin, polyketone resin, polyetherimide resin, polyarylate resin, liquid crystal polymer, polyether sulfone resin, polyether ketone resin, polythioether ketone resin, polyether ether ketone resin, polyimide resin, polyamideimide resin, polyethylene tetrafluoride resin, etc.

For the purpose of modification, the following compounds can be added. The ordinary additives that can be added in this case include a coupling agent such as an isocyanate-based compound, organic silane-based compound, organic titanate-based compound, organic borane-based compound or epoxy compound, a plasticizer such as a polyalkylene oxide oligomer-based compound, thioether-based compound, ester-based compound or organic phosphorus-based compound, a crystal nucleating agent such as talc, kaolin, organic phosphorus compound or polyether ether ketone, a metal soap such as montanic acid wax, lithium stearate or aluminum stearate, a releasing agent such as ethylenediamine/stearic acid/sebacic acid polycondensation product or silicone-based compound, a coloration preventive such as a hypophosphite, further, a lubricant, ultraviolet light absorber, colorant, flame retarder, foaming agent, etc. It is not preferred that the amount of any of the above-mentioned compounds is more than 20 wt % based on the weight of the entire composition, since the properties peculiar to the PPS resin are impaired. Preferred is 10 wt % or less, and more preferred is 1 wt % or less.

In this invention, it is preferred to mix a coupling agent such as an organic silane, since the low-temperature toughness can be further enhanced. The amount of the organic silane mixed is in a range from 0.1 to 3 parts by weight per 100 parts by weight of the PPS resin (a). A preferred range is from 0.5 to 2.5 parts by weight.

A filler can also be mixed with the PPS resin composition of this invention to such an extent that the effects of this invention are not impaired. Examples of the filler include fibrous fillers such as glass fibers, carbon fibers, potassium titanate whiskers, zinc oxide whiskers, calcium carbonate whiskers, wollastonite whiskers, aluminum borate whiskers, aramid fibers, alumina fibers, silicon carbon fibers, ceramic fibers, asbestos fibers, gypsum fibers and metallic fibers, silicates such as talc, wollastonite, zeolite, sericite, mica, kaolin, clay, pyrophyllite, bentonite, asbestos and alumina silicate, metal compounds such as silicon oxide, magnesium oxide, alumina, zirconium oxide, titanium oxide and iron oxide, carbonates such as calcium carbonate, magnesium carbonate and dolomite, sulfates such as calcium sulfate and barium sulfate, hydroxides such as calcium hydroxide, magnesium hydroxide and aluminum hydroxide, and non-fibrous fillers such as glass beads, glass flakes, glass powder, ceramic beads, boron nitride, silicon carbide, carbon black, silica and graphite. They can also be hollow. Two or more of these fillers can also be used together. These fillers can also be preliminarily treated with a coupling agent such as an isocyanate-based compound, organic silane-based compound, organic titanate-based compound, organic borane-based compound or epoxy compound before they are used.

[Morphology]

The PPS resin composition of this invention is required to be such that the PPS resin forms a continuous phase (matrix), while the olefin-based resin forms a dispersion phase. In this case, the excellent heat resistance, chemicals resistance and barrier properties peculiar to the PPS resin can be sustained also as the properties of the resin composition, and further, the resin composition can also have excellent flowability, flexibility, impact properties and low-temperature toughness.

Figure 1:
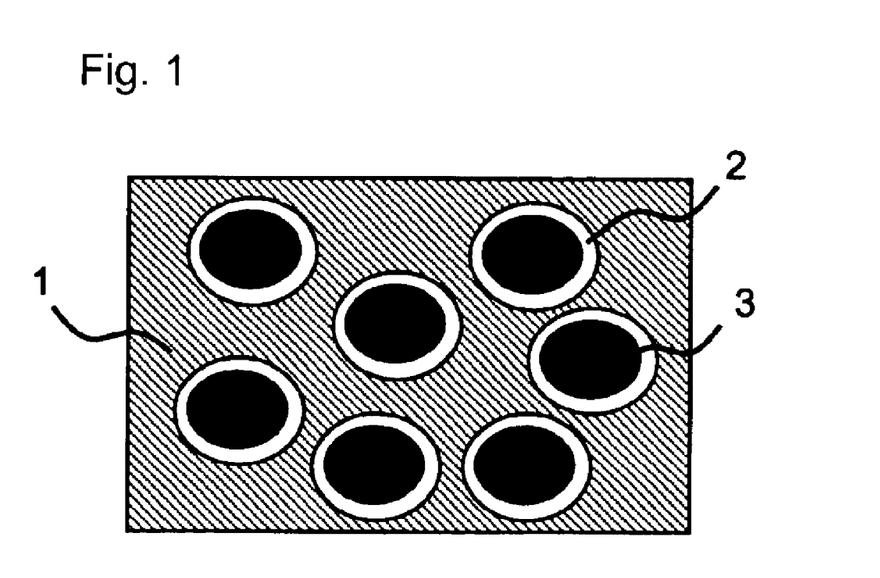
FIG. 1 is a model drawing showing a core-shell dispersion phase structure.

Moreover, the PPS resin composition of this invention is required to be such that, as shown in FIG. 1, the olefin-based resin (b) forming a dispersion phase has a core-shell structure. In FIG. 1, a PPS resin 1 forms a continuous phase (matrix), and an epoxy group-containing olefin copolymer 2 (b-1) forms a primary dispersion phase (shell component) and further forms a core-shell dispersion phase having an ethylene/α-olefin copolymer 3 contained as a secondary dispersion phase (core component) in the primary dispersion phase (shell component). It has been found that if such a core-shell structure is formed, especially the impact properties in a low-temperature range (i.e., low-temperature toughness) can be remarkably improved.

Figure 2:
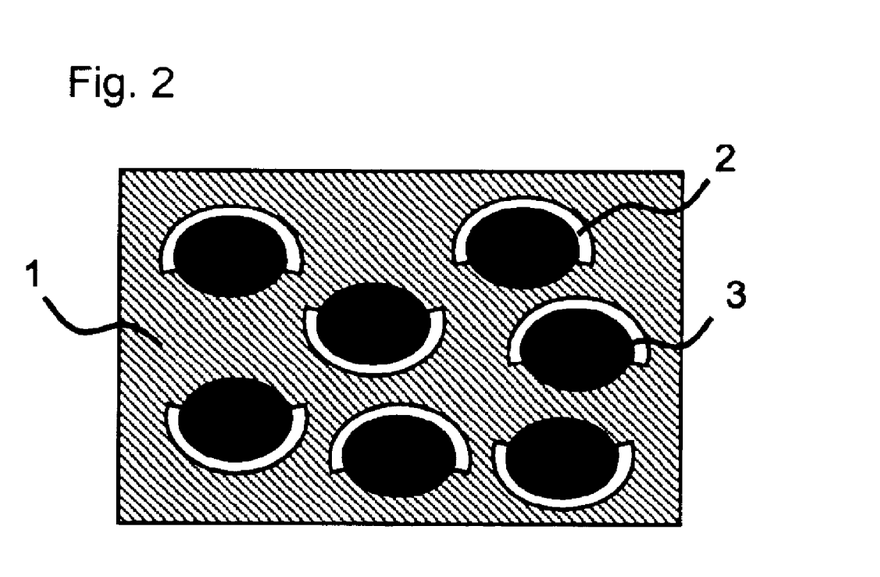
FIG. 2 is a model drawing showing a core-shell dispersion phase structure having a core component partially contained in a shell component.

As for the core-shell structure, it is preferred that, in each core-shell particle, the shell component contains the entire core component as shown in FIG. 1, but the shell component may also partially contain the core component as shown in FIG. 2. In this case, it is preferred that 50% or more of the circumference of each core-shell particle is covered with the component (b-1). More preferred is 80% or more.

Whether or not the core-shell structure is formed can be judged by observing the resin composition or also by observing the molded part obtained from the resin composition. In the case where the resin composition is observed, the judgment can be made by staining a section of the PPS resin composition of this invention with ruthenium, obtaining a slice of 0.1 $\mu$m or less by cutting, and observing at a 100,000-fold magnification using a transmission electron microscope.

In this invention, the olefin-based resin (b) having a core-shell structure means that the rate of the number of the dispersed particles having the core-shell structure to the total number of dispersed particles observed like this is 50% or more, preferably 80% or more. In the case where the rate of the dispersed particles having the core-shell structure is less than 50%, it is defined in this specification that the olefin-based resin (b) does not have the core-shell structure.

Furthermore, it is preferred that the average particle size of the olefin-based resin (b) dispersed as particles in the PPS resin (a) is 0.8 $\mu$m or less. More preferred is 0.5 $\mu$m or less. The dispersion pattern of the olefin-based resin (b) can be judged by freezing the PPS resin composition without staining it, obtaining a slice of 0.1 $\mu$m or less by cutting, and observing with a transmission electron microscope. For optional 100 particles of the olefin-based resin as the dispersion phase, the respective largest diameters and the smallest diameters are measured and averaged to obtain the particle sizes of the respective particles in the dispersion phase, and they are number-averaged to obtain an average particle size.

[Flowability (MFR)]

The PPS resin composition of this invention is required to be such that the MFR measured at a temperature of 315.5° C. and at a load of 5000 g according to ASTM-D-1238 is in a range from 10 to 50 g/10 min. A preferred range is from 14 to 30 g/10 min, and a more preferred range is from 15 to 26 g/10 min. An MFR of less than 10 g/10 min is not preferred, since poor filling occurs in the injection molding for producing an oversized molded part, or since a molding machine with a large clamping pressure must be used. An MFR of more than 50 g/10 min is not preferred either, since the molded part tends to decline in impact properties.

[Low-Temperature Toughness]

The PPS composition of this invention is required to be such that the notched impact strength measured at a temperature of −40° C. according to ASTM-D-256 is 300 J/m or higher. Preferred is 500 J/m or higher, and more preferred is 680 J/m or higher. The method of measuring the impact strength is described later in detail. An impact strength of lower than 300 J/m is not preferred, since an oversized molded part obtained from the composition may be cracked by impact when it is used in a low-temperature environment.

[Method for Producing a PPS Resin]

A PPS resin can be produced at high yield by letting a polyhalogenated aromatic compound and a sulfidizing agent react with each other in a polar organic solvent, to produce a PPS resin, and collecting and post-treating it.

A polyhalogenated aromatic compound refers to a compound having two or more halogen atoms in the molecule. Examples of the polyhalogenated aromatic compound include p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5-dichloro-p-xylene, 1,4-dibromobenzene, 1,4-diiodobenzene, 1-methoxy-2,5-dichlorobenzene, etc. Among them, it is preferred to use p-dichlorobenzene. Furthermore, two or more polyhalogenated aromatic compounds can also be combined to make a copolymer, but it is preferred to use a p-dihalogenated aromatic compound as a main component.

The amount of the polyhalogenated aromatic compound used is in a range from 0.9 to 2.0 moles per 1 mole of the sulfidizing agent for obtaining a PPS resin with a viscosity suitable for processing. A preferred range is from 0.95 to 1.5 moles, and a more preferred range is from 1.005 to 1.2 moles.

Examples of the sulfidizing agent include alkali metal sulfides, alkali metal hydrosulfides and hydrogen sulfide.

Examples of the alkali metal sulfides include lithium sulfide, sodium sulfide, potassium sulfide, rubidium sulfide, cesium sulfide and a mixture consisting of two or more of the foregoing. Above all, sodium sulfide can be preferably used. These alkali metal sulfides can be used as hydrates, aqueous mixtures or anhydrides.

Examples of the alkali metal hydrosulfide include sodium hydrosulfide, potassium hydrosulfide, lithium hydrosulfite, rubidium hydrosulfide, cesium hydrosulfide and a mixture consisting of two of more of the foregoing. Among them, sodium hydrosulfide can be preferably used. These alkali metal hydrosulfides can be used as hydrates, aqueous mixtures or anhydrides.

In this invention, in the case where the sulfidizing agent is partially lost due to dehydration operation or the like before the initiation of polymerization reaction, the amount of the sulfidizing agent charged means the amount obtained by subtracting the loss from the actually charged amount.

The sulfidizing agent can also be used together with an alkali metal hydroxide and/or an alkaline earth metal hydroxide. Preferred examples of the alkali metal hydroxide include sodium hydroxide, potassium hydroxide, lithium hydroxide, rubidium hydroxide, cesium hydroxide and a mixture consisting of two or more of the foregoing. Examples of the alkaline earth metal hydroxide include calcium hydroxide, strontium hydroxide and barium hydroxide. Above all, sodium hydroxide can be preferably used.

In the case where an alkali metal hydrosulfide is used as the sulfidizing agent, it is especially preferred to use it together with an alkali metal hydroxide. The amount of the alkali metal hydroxide used is in a range from 0.95 to 1.20 moles per 1 mole of the alkali metal hydrosulfide. A preferred range is from 1.00 to 1.15 moles, and a more preferred range is from 1.005 to 1.100 moles.

An example of the method for producing the PPS resin (a) used in this invention is particularly described below in the order of pretreatment step, polymerization reaction step, recovery step and posttreatment step

[Pretreatment Step]

The sulfidizing agent is usually used as a hydrate. It is preferred to heat the mixture containing an organic polar solvent and the sulfidizing agent for removing extra water from the system, before adding the polyhalogenated aromatic compound. If too much water is removed as a result of this operation, it is preferred to add water for covering the shortage.

The sulfidizing agent can also be an alkali metal sulfide produced from an alkali metal hydrosulfide and an alkali metal hydroxide in situ in the reaction system or in a reactor different from the polymerization reactor. Desirable production conditions are such that an alkali metal hydrosulfide and an alkali metal hydroxide are added to an organic polar solvent in an inert gas atmosphere in a temperature range from room temperature to 150° C., especially from room temperature to 100° C., and are heated to 150° C. or higher, especially to 180–260° C. at atmospheric pressure or reduced pressure for distilling away water. For accelerating the distillation removal of water, toluene or the like can also be added for the reaction.

It is preferred that the amount of water in the polymerization reaction system is in a range from 0.5 to 10.0 moles per 1 mole of the charged sulfidizing agent. The amount of water in the polymerization reaction system refers to the amount of water obtained by subtracting the amount of water removed outside the polymerization reaction system from the amount of water charged into the polymerization reaction system. The water charged can be any of liquid water, aqueous solution, crystal water and the like. A more preferred range of the amount of water is from 0.75 to 2.5 moles per 1 mole of the sulfidizing agent. A more preferred range is from 1.0 to 1.25 moles. To keep the amount of water in this range, water can also be added before or during polymerization.

[Polymerization Reaction Step]

A sulfidizing agent and a polyhalogenated aromatic compound are caused to react with each other in an organic polar solvent such as N-methyl-2-pyrrolidone in a temperature range from 200° C. to lower than 290° C., to produce a PPS resin.

For initiating the polymerization reaction step, a sulfidizing agent and a polyhalogenated aromatic compound are added to an organic polar solvent, desirably in an inert gas atmosphere in a temperature range from room temperature to 220° C., preferably 100 to 220° C. In this stage, a polymerization aid such as sodium acetate can also be added. The polymerization aid means a substance capable of acting to increase the viscosity of the PPS resin obtained. The charging order of raw materials can be arbitrary or simultaneous.

The mixture is usually heated to a temperature of 200° C. to 290° C. The heating rate is not especially limited, but is usually selected in a range from 0.01 to 5° C./min. A more preferred range is from 0.1 to 3° C./min.

Finally the temperature is raised to a temperature of 250 to 290° C., and the reaction is carried out at the temperature for 0.25 to 50 hours, preferably 0.5 to 20 hours.

Carrying out the reaction for a certain period of time, for example, at a temperature of 200° C. to 245° C. and then heating to a final temperature of 250 to 290° C. is effective for obtaining a higher polymerization degree. In this case, the reaction time at a temperature of 200° C. to 245° C. is usually selected in a range from 0.25 hour to 20 hours, preferably 0.25 to 10 hours.

[Recovery Step]

After completion of polymerization, a solid matter is recovered from the polymerization reaction product containing the polymer, solvent, etc.

For obtaining a PPS resin (a-1) with a chloroform extractable fraction of 2 to 4 wt % used in this invention, it is preferred to recover under a quickly cooling condition. One of preferred recovery methods is the flash method. The flash method refers to a method, in which a polymerization reaction product is flashed from a high-temperature high-pressure state (usually 250° C. or higher and 8 kg/cm² or higher) to an atmosphere of atmospheric pressure or reduced pressure, for recovering the solvent and also for recovering the polymer as a powder. In this case, flashing means to eject the polymerization reaction product from a nozzle. The atmosphere into which the polymerization reaction product is flashed is, for example, nitrogen or water vapor atmosphere of atmospheric pressure, and the temperature can be usually selected in a range from 150° C. to 250° C.

The flash method is an economically excellent recovery method, since the solid matter as well as the solvent can be recovered in a relatively short period of time. According to this recovery method, impurities such as an ionic compound containing metallic ions such as sodium ions and an organic oligomer tend to stray into the polymer in the process of solidification.

On the other hand, for recovering the PPS resin (a-2) used in this invention, a method comprising the steps of gradually cooling while crystallizing the polymerization reaction product and acquiring the solid matter by filtration for recovery is preferred. This method tends to be somewhat low in productivity, since the gradual cooling for recovering takes time, compared with the flash method. Furthermore, there must be another step of separating NMP from the solid matter. However, probably because particles are at first eliminated in the process of crystallization, impurities such as a remaining ionic compound and an organic oligomer are likely to be removed from the recovered solid matter.

[Posttreatment Step]

It is preferred that the PPS resin (a) used in this invention is washed by means of acid treatment, hot water treatment or organic solvent after it has underwent the above-mentioned steps of polymerization and recovery.

The acid treatment can be carried out as described below. The acid used for the acid treatment is not especially limited if it does not act to decompose the PPS resin. Examples of the acid include acetic acid, hydrochloric acid, sulfuric acid, phosphoric acid, silicic acid, carbonic acid, propylic acid, etc. Among them, acetic acid and hydrochloric acid can be more preferably used. An acid such as nitric acid that decomposes and deteriorates the PPS resin is not preferred.

An example of acid treatment is immersing the PPS resin in an acid or an aqueous solution of an acid, and the mixture can also be as required stirred or heated. In the case where acetic acid is used for example, the PPS resin powder is immersed in an aqueous solution of pH 4 heated at 80 to 200° C. and the mixture is stirred for 30 minutes to obtain sufficient effects. The acid-treated PPS resin is washed with cold or hot water several times to physically remove the acid, salt or the like remaining. It is preferred that the water used for washing is distilled water or deionized water, for preventing that the preferred effect of acid treatment in chemically modifying the PPS resin is impaired.

The hot water treatment can be carried out as described below. For hot water treatment of the PPS resin, it is preferred that the hot water temperature is 100° C. or higher. More preferred is 120° C. or higher, and further more preferred is 150° C. or higher. Especially preferred is 170° C. or higher. A temperature of lower than 100° C. is not preferred, since the preferred effect in chemically modifying the PPS resin is small.

To exhibit the preferred effect of hot water washing in chemically modifying the PPS resin, it is preferred that the water used is distilled water or deionized water. The operation of hot water treatment is usually carried out by a method of adding a predetermined amount of the PPS resin into a predetermined amount of water and heating and stirring the mixture in a pressure vessel. As for the ratio of the PPS resin to water, it is preferred that the amount of water is larger. Usually, the bath ratio is selected to ensure that 200 g or less of the PPS resin is used for 1 kg of water.

The desirable atmosphere of treatment is an inert gas atmosphere for avoiding the undesirable decomposition of end groups. Furthermore, it is preferred that after completion of hot water treatment, the PPS resin is washed several times with hot water for removing the remaining components.

The washing with an organic solvent can be carried out as described below. The organic solvent used for washing the PPS resin is not especially limited if it does not act to decompose the PPS resin. Examples of the organic solvent include nitrogen-containing polar solvents such as N-methylpyrrolidone, dimethylformamide, dimethylacetamide, 1,3-dimethylimidazolidinone, hexamethylphosphoramide and piperazinone, sulfoxide/sulfone-based solvents such as dimethyl sulfoxide, dimethylsulfone and sulfolane, ketone-based solvents such as acetone, methyl ethyl ketone, diethyl ketone and acetophenone, ether-based solvents such as dimethyl ether, dipropyl ether, dioxane and tetrahydrofuran, halogen-based solvents such as chloroform, methylene chloride, trichloroethylene, dichloroethylene, perchloroethylene, monochloroethane, dichloroethane, tetrachloroethane, perchloroethane and chlorobenzene, alcohol/phenol-based solvents such as methanol, ethanol, propanol, butanol, pentanol, ethylene glycol, propylene glycol, phenol, cresol, polyethylene glycol and polypropylene glycol. Among these organic solvents, the use of N-methylpyrrolidone, acetone, dimethylformamide, chloroform or the like is especially preferred. One of these organic solvents can be used, or two or more of them can also be used as a mixture.

As an example of washing with an organic solvent, the PPS resin can be immersed in the organic solvent, and as required the mixture can also be stirred or heated. The temperature at which the PPS resin is washed with the organic solvent is not especially limited, and can be selected as desired in a range from room temperature to about 300° C. At a higher washing temperature, the washing efficiency tends to be higher, but usually a sufficient effect can be obtained in a washing temperature range from room temperature to about 150° C. Washing at a temperature higher than the boiling point of the organic solvent under pressurization in a pressure vessel is also possible. The washing time period is not especially limited either. Depending on the washing conditions, in the case of batch washing, washing for more than 5 minutes usually can give a sufficient effect. Continuous washing is also possible.

The acid treatment, hot water treatment and washing with an organic solvent can be adequately used in combination for obtaining the PPS resin (a-1) and the PPS resin (a-2) having the intended melt viscosity and chloroform extractable fraction.

Furthermore, in this invention, for controlling the ash content of the PPS resin, the condition of hot water treatment is one of important conditions. Furthermore, the washing of the PPS resin with hot water after completion of hot water treatment is also an important condition for controlling the ash content. If the amount of washing water is too small, the ash content tends to be large, and if it is too large, the ash content tends to be small.

Moreover, for the purpose of removing the volatile matter, dry heat treatment can also be carried out at a low oxygen concentration while inhibiting crosslinking. It is preferred that the temperature is in a range from 130 to 250° C. A more preferred range is 160 to 250° C. Furthermore, in this case, it is preferred that the oxygen concentration is less than 5 vol %. More desirable is less than 2 vol %. It is preferred that the treatment period of time is in a range from 0.5 to 50 hours. A more preferred range is 1 to 20 hours, and a further more preferred range is 1 to 10 hours.

[Vompounding Method]

As a typical example of the method for producing the PPS resin composition of this invention, raw materials are supplied into a melt kneading machine such as a single-screw or twin-screw extruder, Banbury mixer, kneader or mixing roll and are kneaded at a temperature of 5 to 60° C. higher than the temperature of melting peak of the PPS resin. For controlling the dispersion pattern of the olefin-based resin (b) into a pattern preferred in this invention, it is preferred to keep the shearing force relatively high. Particularly it is preferred to use a method of kneading using a twin-screw extruder, to ensure that the resin temperature during mixing becomes 10 to 20° C. higher than the temperature of melting peak of the PPS resin. In this case, the order of mixing the raw materials is not especially limited. For example, a mixture consisting of all the raw materials can be melt-kneaded, or after some raw materials are melt-kneaded, the remaining raw materials can be added for further melt kneading. As a further other method, after some raw materials are mixed, a single-screw or twin-screw extruder can be used for melt kneading, while a side feeder is used to supply the remaining raw materials for further melt kneading. Any of these methods can be used. Above all, preferred is a method in which the PPS resin is supplied from an upstream supply port of an extruder while the olefin-based resin and other ingredients are supplied from a downstream side feeder of the extruder. As for minor additives, they can also be added after the other ingredients are kneaded and palletized by any of the above-mentioned methods, so that the obtained mixture can be molded.

This invention is described below more particularly in reference to examples.

In the following examples, the properties of materials were measured according to the following methods.

[Observation of Morphology]

ASTM type 1 dumbbell specimens were produced by means of injection molding. The dispersion pattern of the olefin-based resin (b) in the PPS resin matrix (a) was observed by a method of cutting a specimen at the center in the direction transverse to the molding direction, freezing it without staining, obtaining a slice of 0.1 $\mu$m or less by cutting from the central portion of its section, and observing at a 100,000-fold magnification using a transmission electron microscope.

Furthermore, whether or not the core-shell structure had been formed was judged by a method of cutting a specimen at the center in the direction transverse to the molding direction, staining the center of its section, obtaining a slice of 0.1 $\mu$m or less by cutting at room temperature, and observing at a 100,000-fold magnification using a transmission electron microscope. In a state where 20 or more particles of the dispersion phase could be observed in the same visual field, whether or not the core-shell structure had been formed was judged for each particle of the dispersion phase, and the rate of the number of the particles having the core-shell structure to the total number of dispersed particles was calculated. The result was judged in reference to the following criterion.

Double circle: 80% or more of the particles had the core-shell structure formed (Good).

Single circle: 50% to less than 80% of the particles had the core-shell structure formed (Rather good).

Ex: Less than 50% of the particles had the core-shell structure formed (No good).

[MFR]

The MFR was measured at a temperature of 315.5° C. and at a load of 5000 g according to ASTM-D-1238-86.

[Chloroform Extractable Fraction]

About 10 g of the PPS polymer was weighed and placed in cylindrical filter paper, and 200 mL of chloroform was used for Soxhlet extraction at a bath temperature of 120° C. for 5 hours. After completion of extraction, chloroform was distilled away, and the remaining amount was weighed for calculating the extractable fraction based on the weight of the polymer.

[Ash Content]

About five grams of the PPS resin dried at 150° C. for 1 hour was weighed, placed in a crucible, preliminarily burned using an electric heater for about 3 hours, and burned in an electric furnace at 550° C. for about 20 hours, for perfect incineration. The residue was weighed, and the rate of the weight of the residue to the weight of the dried resin was calculated.

[Impact Strength]

Injection molding was carried out to produce ⅛-inch thick notched-specimens according to ASTM-D-256. The notched impact strength was measured at 23° C. according to ASTM-D-256. Five specimens were measured, and the measured values were averaged.

[Low-temperature Toughness]

The notched impact strength was measured according to ASTM-D-256 as described above, except that the measuring temperature was −40° C. When an oversized square plate described later was measured, notched specimens formed as specified in ASTM-D-256 were obtained by cutting the square plate in the molding direction, and the specimens were measured similarly.

[Low-temperature High-Speed Tensile Elongation]

The breaking elongation was measured with ASTM type 1 dumbbell specimens at a tensile speed of 500 mm/min according to ASTM-D-638, except that the measuring temperature was −40° C. Three specimens were measured, and the measured values were averaged.

[Moldability of Oversized Molded Part]

A square plate of 150 mm×150 mm×3 mm was produced by means of molding, and the moldability was judged from the appearance of the molded part according to the following criterion.

Double circle: Moldable with good appearance
Single circle: Moldable with some flow marks
Triangle: Moldable with outstanding flow marks
X: Not moldable due to low flowability

REFERENCE EXAMPLE 1

Production of PPS-1

A 20-liter autoclave having a stirrer and a valve at the bottom was charged with 2383 g (20.0 moles) of 47% sodium hydrosulfide (Sankyo Kasei Co., Ltd.), 836 g (20.1 moles) of 96% sodium hydroxide, 3960 g (40.0 moles) of N-methyl-2-pyrrolidone (hereinafter called NMP), 625 g (7.62 moles) of sodium acetate and 3000 g of ion exchange water, and while nitrogen was introduced at atmospheric pressure, the mixture was gradually heated up to 225° C., taking about 3 hours, to distil away 4200 g of water and 80 g of NMP. Then, the reaction vessel was cooled to 160° C. The amount of water remaining in the system per 1 mole of the charged alkali metal sulfide was 0.17 mole. The amount of hydrogen sulfide that had drifted away was 0.023 mole.

Subsequently 2925 g (19.9 moles) of p-dichlorobenzene (produced by Sigma-Aldrich) and 1515 g (15.3 moles) of NMP were added, and the reaction vessel was sealed under nitrogen gas. Then, with stirring at 400 rpm, the mixture was heated from 200° C. to 225° C. at a rate of 0.8° C./min, and kept at 225° C. for 30 minutes. The mixture was then heated up to 274° C. at a rate of 0.3° C./min, and kept at 274° C. for 50 minutes, being further heated up to 282° C. The ejection valve at the bottom of the autoclave was opened, and under pressurization with nitrogen, the content was flashed into a vessel with a stirrer, taking 15 minutes. At 250° C., the mixture was stirred for a while to remove most of NMP, and a solid matter containing PPS and salts was recovered.

The obtained solid matter and 15120 g of ion exchange water were placed in an autoclave with a stirrer, for washing at 70° C. for 30 minutes, and the mixture was suction-filtered using a glass filter. Then, 17280 g of ion exchange water heated to 70° C. was injected into the glass filter, and the mixture was suction-filtered to obtain a cake.

The obtained cake and 11880 g of ion exchange water were placed in an autoclave with a stirrer, and the atmosphere in the autoclave was replaced by nitrogen. The mixture was heated up to 192° C. and kept at the temperature for 30 minutes. Then, the autoclave was cooled, and the content was taken out.

The content was suction-filtered using a glass filter, and 17280 g of 70° C. ion exchange water was injected into the filter. The mixture was suction-filtered to obtain a cake. The obtained cake was dried in hot air at 80° C., and further dried in vacuum at 120° C. for 24 hours, to obtain a dry PPS. The obtained PPS-1 had an MFR of 200 g/10 min and a chloroform extractable fraction of 2.6%.

REFERENCE EXAMPLE 2

Production of PPS-2

Polymerization, washing, recovery and drying were carried out as described for Reference Example 1, expect that the amount of p-dichlorobenzene added was 2944 g (20.0 moles). The obtained PPS-2 had an MFR of 270 g/10 min, and a chloroform extractable fraction of 2.7%.

REFERENCE EXAMPLE 3

Production of PPS-3

The PPS-1 obtained as described for Reference Example 1 was heated at 200° C. for 8 hours in a nitrogen stream, to obtain a crosslinked PPS. The obtained PPS-3 has an MFR of 160 g/10 min, and a chloroform extractable fraction of 2.1%.

REFERENCE EXAMPLE 4

Production of PPS-4

A 20-liter autoclave with a stirrer was charged with 2383 g (20.0 moles) of 47% sodium hydrosulfide (Sankyo Kasei Co., Ltd.), 848 g (20.4 moles) of 96% sodium hydroxide, 3267 g (33 moles) of NMP, 531 g (6.5 moles) of sodium acetate and 3000 g of ion exchange water, and while nitrogen was introduced at atmospheric pressure, the mixture was gradually heated up to 225° C., taking about 3 hours, to distil away 4200 g of water and 80 g of NMP. Then, the reaction vessel was cooled to 160° C. The amount of hydrogen sulfide that had drifted away was 0.018 mole per 1 mole of the charged alkali metal sulfide.

Subsequently 2974 g (20.2 moles) of p-dichlorobenzene (produced by Sigma-Aldrich) and 2594 g (26.2 moles) of NMP were added, and the reaction vessel was sealed under nitrogen gas. With stirring at 400 rpm, the mixture was heated up to 227° C. at a rate of 0.8° C./min, and then up to 270° C. at a rate of 0.6° C., being kept at 270° C. for 140 minutes. Then, while the mixture was cooled down to 250° C. at a rate of 1.3° C./min, 684 g (38 moles) of ion exchange water was pressed into the autoclave. The mixture was then cooled down to 200° C. at a rate of 0.4° C./min, and quickly cooled to near the room temperature. The content was taken out and diluted with 10 liters of NMP, and the mixture was filtered using a sieve (80-mesh) for separation into the solvent and the solid matter. The obtained particles were washed with 20 liters of warm water several times, and the mixture was filtered to obtain particles. They were then supplied into 10 liters of NMP heated to 100° C., and after stirring for about 1 hour, the mixture was filtered to obtain particles. They were further washed with hot water several times, and then with 20 liters of warm water containing 9.8 g of acetic acid. The mixture was filtered to obtain particles that were washed with 20 liters of warm water. The mixture was filtered to obtain PPS polymer particles. They were dried in hot air at 80° C. and dried in vacuum at 120° C. for 24 hours, to obtain a dry PPS. The obtained PPS-4 had an MFR of 180 g/10 min and a chloroform extractable fraction of 0.3%.

REFERENCE EXAMPLE 5

Production of PPS-5

Polymerization, washing, recovery and drying were carried out as described for Reference Example 4, except that the amount of p-dichlorobenzene added was 3031 g (20.6 moles).

The obtained PPS-5 had an MFR of 400 g/10 min and a chloroform extractable fraction of 0.4%.

REFERENCE EXAMPLE 6

Production of PPS-6

A 20-liter autoclave having a stirrer and a valve at the bottom was charged with 2383 g (20.0 moles) of 47% sodium hydrosulfide (Sankyo Kasei Co., Ltd.), 831 g (19.9 moles) of 96% sodium hydroxide, 3960 g (40.0 moles) of NMP and 3000 g of ion exchange water, and while nitrogen was introduced at atmospheric pressure, the mixture was gradually heated up to 225° C., taking about 3 hours, to distil away 4200 g of water and 80 g NMP. Then, the reaction vessel was cooled to 160° C. The amount of water remaining in the system per 1 mole of the charged alkali metal sulfide was 0.17 mole. Furthermore, the amount of hydrogen sulfide that had drifted away per 1 mole of the charged alkali metal sulfide was 0.021 mole.

Subsequently, 2942 g (20.0 moles) of p-dichlorobenzene (produced by Sigma-Aldrich) and 1515 g (15.3 moles) of NMP were added, and the reaction vessel was sealed under nitrogen gas. Then, with stirring at 400 rpm, the mixture was heated from 200° C. to 227° C. at a rate of 0.8° C./min, and then heated up to 274° C. at a rate of 0.6° C./min, being kept at 274° C. for 50 minutes, then further heated up to 282° C. The ejection valve at the bottom of the autoclave was opened, and under pressurization with nitrogen, the content was flashed into a vessel with a stirrer, taking 15 minutes. At 250° C., the mixture was stirred for a while to remove most of NMP, and a solid matter containing a PPS and salts was recovered.

The obtained solid matter and 15120 g of ion exchange water were placed in an autoclave with a stirrer, for washing at 70° C. for 30 minutes, and the mixture was suction-filtered using a glass filter. Then, 17280 g of ion exchange water heated to 70° C. was injected into the glass filter, and the mixture was suction-filtered to obtain a cake. The obtained cake and 11880 g of ion exchange water were placed in an autoclave with a stirrer, and the atmosphere in the autoclave was replaced by nitrogen. The mixture was heated up to 192° C. and kept at the temperature for 30 minutes. Then, the autoclave was cooled, and the content was taken out. The content was suction-filtered using a glass filter, and 17280 g of 70° C. ion exchange water was injected into the filter. The mixture was suction-filtered to obtain a cake. The obtained cake was dried in hot air at 80° C. and dried in vacuum at 120° C. for 24 hours, to obtain a dry PPS. The obtained PPS had an MFR of 3000 g/10 min. The PPS obtained as described above was heated for crosslinking in air at 200° C., till the MFR reached 150 g/10 min, to obtain PPS-6. The obtained PPS-6 had a chloroform extractable fraction of 1.8%.

The physical properties of PPS-1 to PPS-6 are shown in Table 1.

TABLE 1

| | Chloroform extractable fraction (wt %) | MFR (g/10 min) | Ash content (wt %) |
|---|---|---|---|
| PPS-1 | 2.6 | 260 | 0.51 |
| PPS-2 | 2.7 | 270 | 0.55 |
| PPS-3 | 2.1 | 160 | 0.45 |
| PPS-4 | 0.3 | 180 | 0.04 |
| PPS-5 | 0.4 | 400 | 0.05 |
| PPS-6 | 1.8 | 150 | 0.65 |

EXAMPLES 1 to 8

The respective ingredients shown in Table 2 were dry-blended at any of the ratios shown in Table 2, and the blend was melt-kneaded using Model TEX30 Twin-screw Extruder produced by The Japan Steel Works, Ltd. with the cylinder temperature set in a range from 260 to 290° C. at a screw speed of 200 rpm, and a strand cutter was used for cutting into pellets. The pellets were dried at 110° C. overnight, and molded into ASTM type 1 dumbbell specimens and notched impact strength specimens using an injection molding machine (IS100FA produced by Toshiba Machine Co., Ltd.) at a cylinder temperature of 300° C. and at a mold temperature of 130° C. The respective samples were tested to find whether or not they had the core-shell structure formed, as well as their properties such as flowability and impact strength. The results were as shown in Table 2. The respective samples had the core-shell structure, and were good in all of flowability, impact strength and low-temperature toughness.

As models of oversized molded parts, oversized square plates of 150 mm×150 mm×3 mm were produced by molding using Model FN1000-12H Injection Molding Machine produced by Nissei Plastic Industrial Co., Ltd. at a cylinder temperature of 300° C. and at a mold temperature of 60° C. The moldabilities and the low-temperature impact strengths of the specimens cut out of the oversized square plates were as shown in Table 2. All the samples were good in moldability and low-temperature toughness.

COMPARATIVE EXAMPLE 1

Pelletization and evaluation were carried out as described for Working Example 1, except that the olefin-based resin used was olefin 1 alone. The results were as shown in Table 3. The material was poor in flowability and impact properties. Because of low flowability, an oversized square plate could not be produced by molding.

COMPARATIVE EXAMPLE 2

Pelletization and evaluation were carried out as described for Working Example 1, except that the PPS-4 of Reference Example 4 was used. The results were as shown in Table 3. The material was poor in flowability. The measured impact properties and low-temperature toughness of the resin composition were good, but since the moldability into the oversized square plate was low, the measured low-temperature toughness of the oversized square plate was poor.

COMPARATIVE EXAMPLE 3

Pelletization and evaluation were carried out as described for Working Example 2, except that the PPS-6 of Reference Example 6 was used. The results were as shown in Table 3. The material did not have the core-shell structure formed and was poor in flowability and impact properties. The moldability into the oversized square plate was also poor.

COMPARATIVE EXAMPLE 4

Pelletization and evaluation were carried out as described for Working Example 2, except that the PPS-5 of Reference Example 5 was used. The results were as shown in Table 3. The material was poor in low-temperature toughness. The measured low-temperature toughness of the oversized square plate was also low.

COMPARATIVE EXAMPLE 5

Pelletization and evaluation were carried out as described for Working Example 2, except that the ratio of the PPS resin and the olefin-based resin was changed. The results were as shown in Table 3. The material was poor in flowability. The measured impact properties and low-temperature toughness of the resin composition were good, but because of low flowability, no oversized square plate could be produced by means of molding.

COMPARATIVE EXAMPLE 6

Pelletization and evaluation were carried out as described for Working Example 8, except that the PPS-6 of Reference Example 6 was used. The results were as shown in Table 3. The material did not have the core-shell structure formed and was poor in flowability and low-temperature toughness. The moldability into the oversized square plate was also poor.

TABLE 2

| | | | | Working Examples | | | | | | | |
|---|---|---|---|---|---|---|---|---|---|---|---|
| | | | | 1 | 2 | 3 | 4 | 5 | 6 | 7 | 8 |
| PPS resin | (a-1) | PPS-1 | wt % | 65 | | | | 85 | | | 40 |
| | | PPS-2 | wt % | | 65 | | 75 | | 55 | 50 | |
| | | PPS-3 | wt % | | | 65 | | | | | |
| | (a-2) | PPS-4 | wt % | | | | | | 10 | 15 | |
| | | PPS-5 | wt % | | | | | | | | 25 |
| | (a-3) | PPS-6 | wt % | | | | | | | | |
| Olefin-based resin | (b-1) | Olefin 1 | wt % | 10 | 10 | 10 | 20 | 5 | 10 | 10 | 10 |
| | (b-2) | Olefin 2 | wt % | 25 | | | | | | | |
| | | Olefin 3 | wt % | | 25 | 25 | | 10 | 25 | 25 | 25 |
| | | Olefin 4 | wt % | | | | 5 | | | | |
| Antioxidant | | Phenol-based | wt % | | 0.2 | 0.2 | 0.2 | 0.2 | 0.4 | 0.2 | 0.2 |
| | | Phosphorus-based | wt % | | 0.2 | 0.2 | 0.2 | 0.2 | 0.4 | 0.2 | 0.2 |
| Observed morphology | | Core-shell structure | | ⊙ | ⊙ | ⊙ | ○ | ○ | ⊙ | ⊙ | ⊙ |
| Flowability | | MFR | g/10 min | 15 | 20 | 10 | 20 | 40 | 15 | 15 | 10 |
| High-speed tensile elongation | | −40° C. | % | 45 | 38 | 65 | 32 | 29 | 35 | 42 | 58 |
| Notched impact strength | | 23° C. | J/m | 780 | 750 | 690 | 650 | 600 | 800 | 820 | 820 |
| | | −40° C. | J/m | 700 | 680 | 580 | 380 | 450 | 730 | 760 | 700 |
| Oversized square plate | Moldability | | | ⊙ | ⊙ | ○ | ⊙ | ⊙ | ⊙ | ⊙ | ○ |
| | −40° C. impact strength | | J/m | 690 | 680 | 540 | 350 | 450 | 690 | 730 | 660 |

TABLE 3

| | | | | Comparative Examples | | | | | |
|---|---|---|---|---|---|---|---|---|---|
| | | | | 1 | 2 | 3 | 4 | 5 | 6 |
| PPS resin | (a-1) | PPS-1 | wt % | 65 | | | | 55 | 40 |
| | | PPS-2 | wt % | | | | | | |
| | | PPS-3 | wt % | | | | | | |
| | (a-2) | PPS-4 | wt % | | 65 | | | | |
| | | PPS-5 | wt % | | | | 65 | | |
| | (a-3) | PPS-6 | wt % | | | 65 | | | 25 |
| Olefin-based resin | (b-1) | Olefin 1 | wt % | 35 | 10 | 10 | 10 | 20 | 10 |
| | (b-2) | Olefin 2 | wt % | | 25 | | | | |
| | | Olefin 3 | wt % | | | 25 | 25 | 25 | 25 |
| | | Olefin 4 | wt % | | | | | | |

TABLE 3-continued

|  |  |  | Comparative Examples | | | | | |
|---|---|---|---|---|---|---|---|---|
|  |  |  | 1 | 2 | 3 | 4 | 5 | 6 |
| Antioxidant | Phenol-based | wt % |  |  | 0.2 | 0.2 | 0.2 | 0.2 |
|  | Phosphorus-based | wt % |  |  | 0.2 | 0.2 | 0.2 | 0.2 |
| Observed morphology | Core-shell structure |  | X | ⊚ | X | ○ | X | X |
| Flowability | MFR | g/10 min | 1 | 5 | 5 | 18 | 3 | 5 |
| High-speed tensile elongation | −40° C. | % | 10 | 9 | 5 | 7 | 10 | 7 |
| Notched impact strength | 23° C. | J/m | 550 | 770 | 340 | 570 | 760 | 640 |
|  | −40° C. | J/m | 80 | 680 | 100 | 280 | 720 | 410 |
| Oversized square plate | Moldability |  | X | Δ | Δ | ○ | X | Δ |
|  | −40° C. impact strength | J/m | — | 120 | 60 | 120 | — | 150 |

The respective abbreviations in Tables 2 and 3 denote the following compounds.

Olefin-Based Resins:

Olefin 1: Ethylene/glycidyl methacrylate=88/12 wt % copolymer, MFR=3 g/10 min

Olefin 2: Ethylene/1-butene copolymer, density 864 kg/m$^3$, MFR=3.5 g/10 min

Olefin 3: Ethylene/1-butene copolymer, density 861 kg/m$^3$, MFR=0.5 g/10 min

Olefin 4: Ethylene/propylene=85/15 mol % copolymer, MFR=0.4 g/10 min

Antioxidants:

Phenol-based: 3,9-bis[2-(3-(3-t-butyl-4-hydroxy-5-methylphenyl)propionyloxy)-1,1-dimethylethyl]-2,4,8,10-tetraoxaspiro[5,5]undecane Phosphorus-based: Bis(2,4-di-cumylphenyl)pentaerythritol-di-phosphite

REFERENCE EXAMPLE 7

A 20-liter autoclave having a stirrer and a valve at the bottom was charged with 2383 g (20.0 moles) of 47% sodium hydrosulfide (Sankyo Kasei Co., Ltd.), 836 g (20.1 moles) of 96% sodium hydroxide, 3960 g (40.0 moles) of NMP, 625 g (7.62 moles) of sodium acetate and 3000 g of ion exchange water, and while nitrogen was introduced at atmospheric pressure, the mixture was heated up to 225° C., taking about 3 hours, to distil away 4200 g of water and 80 g NMP. Then, the reaction vessel was cooled to 160° C. The amount of water remaining in the system per 1 mole of the charged alkali metal sulfide was 0.17 mole, and the amount of hydrogen sulfide that had drifted away was 0.0323 mole.

Subsequently, 2925 g (19.9 moles) of p-dichlorobenzene (produced by Sigma-Aldrich) and 1515 g (15.3 moles) of NMP were added, and the reaction vessel was sealed under nitrogen gas. Then, with stirring at 400 rpm, the mixture was heated from 200° C. to 225° C. at a rate of 0.8° C., and kept at 225° C. for 30 minutes. The mixture was then heated up to 274° C. at a rate of 0.3° C./min and kept at 274° C. for 50 minutes, being further heated up to 282° C. The ejection valve at the bottom of the autoclave was opened, and under pressurization with nitrogen, the content was flashed into a vessel with a stirrer, taking 15 minutes. At 250° C., the mixture was stirred for a while, to remove most of NMP, and a solid matter containing a PPS and salts was recovered. The obtained solid matter and 15120 g of ion exchange water were placed in an autoclave with a stirrer, for washing at 70° C. for 30 minutes, and the mixture was suction-filtered using a glass filter. Then, 17280 g of ion exchange water heated to 70° C. was injected into the glass filter, and the mixture was suction-filtered, to obtain a cake.

REFERENCE EXAMPLE 8

Production of PPS-7

The cake obtained in Reference Example 7 and 18144 g of ion exchange water were placed in an autoclave with a stirrer, and the atmosphere in the autoclave was replaced by nitrogen. The mixture was then heated up to 192° C. and kept at the temperature for 30 minutes. Then, the autoclave was cooled, and the content was taken out. The content was suction-filtered using a glass filter, and 32400 g of 70° C. ion exchange water was injected into the filter. The mixture was suction-filtered to obtain a cake. Furthermore, the obtained cake and 18144 g of ion exchange water were placed in an autoclave with a stirrer, and the atmosphere in the autoclave was replaced by nitrogen. The mixture was heated up to 192° C. and kept at the temperature for 30 minutes. Then, the autoclave was cooled, and the content was taken out. The content was suction-filtered using a glass filter, and 32400 g of 70° C. ion exchange water was injected into the filter. The mixture was suction-filtered to obtain a cake.

The obtained cake was dried in hot air at 80° C. and further dried in vacuum at 120° C. for 24 hours, to obtain a dry PPS. The obtained PPS-7 had an MFR of 260 g/10 min, a chloroform extractable fraction of 2.4% and an ash content of 0.20 wt %.

REFERENCE EXAMPLE 9

Production of PPS-8

The cake obtained in Reference Example 7 and 18144 g of ion exchange water were placed in an autoclave with a stirrer, and the atmosphere in the autoclave was replaced by nitrogen. The mixture was heated up to 192° C. and kept at the temperature for 30 minutes. Then, the autoclave was cooled, and the content was taken out. The content was suction-filtered using a glass filter, and 32400 g of 70° C. ion exchange water was injected into the filter. The mixture was suction-filtered to obtain a cake. The obtained cake was dried in hot air at 80° C. and further dried in vacuum at 120° C. for 24 hours, to obtain a dry PPS. The obtained PPS-8 had an MFR of 230 g/10 min, a chloroform extractable fraction of 2.4% and an ash content of 0.45 wt %.

REFERENCE EXAMPLE 10

Production of PPS-9

The cake obtained in Reference Example 7 and 25920 g of ion exchange water were placed in an autoclave with a stirrer, and the atmosphere in the autoclave was replaced by nitrogen. The mixture was heated up to 192° C. and kept at the temperature for 30 minutes. Then, the autoclave was cooled, and the content was taken out. The content was suction-filtered using a glass filter, and 19440 g of 70° C. ion exchange water was injected into the filter, and the mixture was suction-filtered to obtain a cake. The obtained cake was dried in hot air at 80° C. and further dried in vacuum at 120°

C. for 24 hours, to obtain a dry PPS. The obtained PPS-9 had an MFR of 210 g/10 min, a chloroform extractable fraction of 2.5%, and an ash content of 0.51 wt %.

REFERENCE EXAMPLE 11

Production of PPS-10

The cake obtained in Reference Example 7 and 18144 g of ion exchange water were placed in an autoclave with a stirrer. The atmosphere in the autoclave was replaced by nitrogen, and the mixture was heated up to 192° C., and kept at the temperature for 30 minutes. Then, the autoclave was cooled, and the content was taken out. The content was suction-filtered using a glass filter, and 19440 g of 70° C. ion exchange water was injected into the filter. The mixture was suction-filtered to obtain a cake. The obtained cake was dried in hot air at 80° C. and further dried in vacuum at 120° C. for 24 hours, to obtain a dry PPS. The obtained PPS-10 had an MFR of 200 g/10 min, a chloroform extractable fraction of 2.5% and an ash content of 0.58 wt %.

REFERENCE EXAMPLE 12

Production of PPS-11

The cake obtained in Reference Example 7 and 18144 g of ion exchange water were placed in an autoclave with a stirrer, and the atmosphere in the autoclave was replaced by nitrogen. The mixture was heated up to 192° C. and kept at the temperature 30 minutes. Then, the autoclave was cooled, and the content was taken out. The content was suction-filtered using a glass filter, and 14580 g of 70° C. ion exchange water was injected into the filter. The mixture was suction-filtered to obtain a cake. The obtained cake was dried in hot air at 80° C. and further dried in vacuum at 120° C. for 24 hours, to obtain a dry PPS. The obtained PPS-11 had an MFR of 190 g/10 min, a chloroform extractable fraction of 2.6% and an ash content of 0.64 wt %.

REFERENCE EXAMPLE 13

Production of PPS-12

The cake obtained in Reference Example 7 and 18144 g of ion exchange water were placed in an autoclave with a stirrer, and the atmosphere in the autoclave was replaced by nitrogen. The mixture was heated up to 192° C. and kept at the temperature for 30 minutes. Then, the autoclave was cooled, and the content was taken out. The content was suction-filtered using a glass filter, and 9720 g of 70° C. ion exchange water was injected into the filter. The mixture was suction-filtered to obtain a cake. The obtained cake was dried in hot air at 80° C. and further dried in vacuum at 120° C. for 24 hours, to obtain a dry PPS. The obtained PPS-12 had an MFR of 170 g/10 min, a chloroform extractable fraction of 2.8%, and an ash content of 0.73 wt %.

The physical properties of the PPS-7 to PPS-12 are shown in Table 4.

TABLE 4

|  | Chloroform extractable fraction (wt %) | MFR (g/10 min) | Ash content (wt %) |
|---|---|---|---|
| PPS-7 | 2.4 | 260 | 0.20 |
| PPS-8 | 2.4 | 230 | 0.45 |
| PPS-9 | 2.5 | 210 | 0.51 |
| PPS-10 | 2.5 | 200 | 0.58 |
| PPS-11 | 2.6 | 190 | 0.64 |
| PPS-12 | 2.8 | 170 | 0.73 |

EXAMPLES 9 to 16

The respective ingredients shown in Table 5 were dry-blended at any of the ratios shown in Table 5, and the blend was melt-kneaded using Model TEX30 Twin-screw Extruder produced by The Japan Steel Works, Ltd. with the cylinder temperature set in a range from 260 to 290° C. at a screw speed of 200 rpm, and a strand cutter was used for cutting into pellets. The pellets were dried at 110° C. overnight, and molded into specimens using an injection molding machine (IS100FA produced by Toshiba Machine Co., Ltd.) at a cylinder temperature of 300° C. and at a mold temperature of 130° C. The respective samples were tested to find their low-temperature toughness values, and the results were as shown in Table 5. The respective samples had the core-shell structure and were good in all of flowability, impact strength and low-temperature toughness. Furthermore, 150 mm square 3 mm thick square plates were also evaluated in moldability as described for Working Example 1, and the results were as shown in Table 5. They were good in both moldability and low-temperature toughness.

COMPARATIVE EXAMPLE 7

Pelletization and evaluation were carried out as described for Working Example 9, except that the PPS-12 of Reference Example 13 was used. The results were as shown in Table 5. The material did not have the core-shell structure formed and was poor in low-temperature toughness. Furthermore, the oversized square plate made from it was poor in both moldability and low-temperature toughness.

TABLE 5

|  |  |  |  | Working Examples | | | | | | | | Comparative Examples |
|---|---|---|---|---|---|---|---|---|---|---|---|---|
|  |  |  |  | 9 | 10 | 11 | 12 | 13 | 14 | 15 | 16 | 7 |
| PPS resin | (a-1) | PPS-7 | wt % |  |  |  |  |  |  |  | 65 |  |
|  |  | PPS-8 | wt % | 65 |  |  |  |  | 65 |  |  |  |
|  |  | PPS-9 | wt % |  |  | 65 |  |  |  |  |  |  |
|  |  | PPS-10 | wt % |  |  |  | 65 |  |  |  |  |  |

TABLE 5-continued

|  |  |  | | Working Examples | | | | | | | | Comparative Examples |
|---|---|---|---|---|---|---|---|---|---|---|---|---|
|  |  |  | | 9 | 10 | 11 | 12 | 13 | 14 | 15 | 16 | 7 |
|  |  | PPS-11 | wt % | 65 |  |  |  | 65 |  | 65 |  |  |
|  |  | PPS-12 | wt % |  |  |  |  |  |  |  |  | 65 |
| Olefin-based resin | (b-1) | Olefin 1 | wt % | 10 | 10 | 10 | 10 | 10 | 10 | 10 | 10 | 10 |
|  | (b-2) | Olefin 5 | wt % |  |  |  |  |  | 15 |  |  |  |
|  |  | Olefin 3 | wt % | 25 | 25 | 25 | 25 | 25 | 10 | 15 | 25 | 25 |
|  |  | Olefin 4 | wt % |  |  |  |  |  |  | 10 |  |  |
| Antioxidant |  | Phenol-based | wt % |  | 0.2 | 0.2 | 0.4 | 0.2 | 0.2 | 0.2 | 0.2 | 0.2 |
|  |  | Phosphorus-based | wt % |  | 0.2 | 0.2 | 0.4 | 0.2 | 0.2 | 0.2 | 0.2 | 0.2 |
| Observed morphology |  | Core-shell structure |  | ◯ | ◉ | ◉ | ◉ | ◯ | ◉ | ◯ | ◯ | X |
| Flowability |  | MFR | g/10 min | 18 | 26 | 24 | 26 | 20 | 29 | 22 | 24 | 18 |
| High-speed tensile elongation |  | −40° C. | % | 35 | 33 | 34 | 28 | 40 | 25 | 35 | 15 | 34 |
| Notched impact strength |  | −40° C. | J/m | 765 | 770 | 820 | 790 | 780 | 650 | 760 | 770 | 180 |
| Oversized square plate |  | Moldability |  | ◉ | ◉ | ◉ | ◉ | ◯ | ◉ | ◉ | ◉ | Δ |
|  |  | −40° C. impact strength | J/m | 720 | 730 | 790 | 780 | 750 | 650 | 720 | 750 | 150 |

The abbreviations stated in Table 5 mean the following compounds.

Olefin-Based Resins:

Olefin 1: Ethylene/glycidyl methacrylate=88/12 wt % copolymer, MFR=3 g/10 min

Olefin 3: Ethylene/1-butene copolymer, density 861 kg/m$^3$, MFR=0.5 g/10 min

Olefin 4: Ethylene/propylene=85/15 mol % copolymer, MFR=0.4 g/10 min

Olefin 5: Ethylene/1-butene copolymer, density 885 kg/m$^3$, MFR=0.5 g/10 min

Antioxidants:

Phenol-based: 3,9-bis[2-(3-(3-t-butyl-4-hydroxy-5-methylphenyl)propionyloxy)-1,1-dimethylethyl]-2,4,8,10-tetraoxaspiro[5,5]undecane Phosphorus-based: Bis(2,4-di-cumylphenyl)pentaerythritol-di-phosphite This invention can provide a polyphenylene sulfide resin composition excellent in the flowability during molding and high in impact properties and low-temperature toughness.

Since the PPS resin composition of this invention is excellent in impact properties, low-temperature toughness and flowability, it can be used as injection-molded articles, especially oversized molded articles such as various containers, automobile parts and machine parts. The PPS resin composition having such features is suitable also for pipes and structures such as cases of general apparatuses and automobiles, molded metallic inserts for electric and electronic use.

What is claim is:

1. A polyphenylene sulfide resin composition comprising (a) a polyphenylene sulfide resin and (b) an olefin-based resin, and satisfying the following conditions (i) through (v):

(i) the mixing ratio of the polyphenylene sulfide resin (a) and the olefin-based resin (b) is such that the amount of the polyphenylene sulfide resin (a) is in a range from 95 to 60 wt %, and the amount of the olefin-based resin (b) is in a range from 5 to 40 wt %, with the total weight of both the ingredients as 100 wt %;

(ii) said olefin-based resin (b) comprising two copolymers: (b-1) an epoxy group-containing olefin copolymer and (b-2) an ethylene/α-olefin copolymer obtained by copoly-merizing ethylene and an α-olefin having 3 to 20 carbon atoms;

(iii) as the morphology of the polyphenylene sulfide resin composition observed by an electron microscope, said polyphenylene sulfide resin (a) forms a continuous phase, and said olefin-based resin (b) forms a dispersion phase and has a core-shell structure having said ethyl-ene/α-olefin copolymer (b-2) acting as a core component contained in said epoxy group-con-taining olefin copolymer (b-1) acting as a shell component;

(iv) the melt flow rate of the polyphenylene sulfide resin composition measured at a temperature of 315.5° C. and at a load of 5000 g according to ASTM-D-1238 is in a range from 10 to 50 g/10 min; and (v) the notched impact strength of the polyphenylene sulfide resin composition measured at −40° C. according to ASTM-D-256 is 300 J/m or more.

2. The polyphenylene sulfide resin composition, according to claim 1, wherein said polyphenylene sulfide resin (a) has an ash content of 0.35 wt % to 0.65 wt %.

3. The polyphenylene sulfide resin composition, according to claim 1, wherein said polyphenylene sulfide resin (a) is (a-1) a polyphenylene sulfide resin having a melt flow rate of 100 to 400 g/10 min as measured at a temperature of 315.5° C. and at a load of 5000 g according to ASTM-D-1238 and having a chloroform extractable fraction of 2 to 4 wt %.

4. The polyphenylene sulfide resin composition, according to claim 3, wherein said polyphenylene sulfide resin (a) further comprises 5 to 80 parts by weight of a polyphenylene sulfide resin (a-2) having a melt flow rate of 50 to 800 g/10 min as measured at a temperature of 315.5° C. and at a load of 5000 g according to ASTM-D-1238 and having a chloroform extractable fraction of 1 wt % or less, and not crosslinked, per 100 parts by weight of said polyphenylene sulfide resin (a-1).

5. The polyphenylene sulfide resin composition, according to claim 1, wherein said polyphenylene sulfide resin (a-1) is obtained by the flash method.

* * * * *

UNITED STATES PATENT AND TRADEMARK OFFICE
CERTIFICATE OF CORRECTION

PATENT NO. : 6,960,628 B2  Page 1 of 1
APPLICATION NO. : 10/746822
DATED : November 1, 2005
INVENTOR(S) : Matsuoka et al It is certified that error appears in the above-identified patent and that said Letters Patent is hereby corrected as shown below:

<u>Column 18</u>
Table 1, at "PPS-1", change "260" to --200--.

Signed and Sealed this

First Day of August, 2006

JON W. DUDAS
*Director of the United States Patent and Trademark Office*